United States Patent [19]
Berkowitz et al.

[11] Patent Number: 5,649,183
[45] Date of Patent: Jul. 15, 1997

[54] METHOD FOR COMPRESSING FULL TEXT INDEXES WITH DOCUMENT IDENTIFIERS AND LOCATION OFFSETS

[75] Inventors: Brian Thomas Berkowitz, Bellevue; Max Loell Benson, Redmond, both of Wash.

[73] Assignee: Microsoft Corporation, Redmond, Wash.

[21] Appl. No.: 986,754

[22] Filed: Dec. 8, 1992

[51] Int. Cl.⁶ .................................................. G06F 17/30
[52] U.S. Cl. ...................... 395/606; 395/761; 395/792; 395/793; 395/898
[58] Field of Search ........................... 364/419, 419.19, 364/962, 963, 974; 382/56; 395/425, 600, 650, 700, 419.1, 419.19, 419.13, 419.01, 603, 606

[56] References Cited

U.S. PATENT DOCUMENTS

| | | | |
|---|---|---|---|
| 5,062,074 | 10/1991 | Kleinberger | 395/601 |
| 5,201,048 | 4/1993 | Coulter et al. | 395/601 |
| 5,293,552 | 3/1994 | Aalbersberg | 395/606 |
| 5,313,604 | 5/1994 | Godwin | 395/427 |
| 5,321,833 | 6/1994 | Cheng et al. | 395/600 |
| 5,375,235 | 12/1994 | Berry et al. | 395/601 |
| 5,398,338 | 3/1995 | Yoshida | 395/601 |
| 5,440,481 | 8/1995 | Kostoff et al. | 364/419.08 |
| 5,488,725 | 1/1996 | Turtle et al. | 395/600 |

FOREIGN PATENT DOCUMENTS 0124097  11/1984  European Pat. Off. ......... G06F 17/30

OTHER PUBLICATIONS

Mullin, J.K., "Accessing Textural Documents using Compressed Indexes of Arrays of Small Bloom Filters", *The Computer Journal*, Aug. 1987, vol. 30, No. 4, pp. 343–348.

Choueka, Y. et al., "Compression of Concordances in Full-Text Retrieval Systems", *11th International Conference on Research & Development in Information Retrieval*, Grenoble, France, Jun. 13–15, 1988, pp. 597–612.

Zobel, Justin et al., "An Efficient Indexing Technique for Full-Text Database Systems", Proceedings of the 18th VLDB Conference, Vancouver, British Columbia, Canada, Aug. 1992, pp. 352–362.

"Indexing and Compressing Full-text Databases for CD-ROM", Witten et al., Journal of Information Science, vol. 17, n(5), p(265–271). Dec. 1990.

*Primary Examiner*—Thomas G. Black
*Assistant Examiner*—Hosain T. Alam
*Attorney, Agent, or Firm*—Seed and Berry LLP

[57] ABSTRACT

A method is disclosed for recording a text index wherein the text index comprises a plurality of data key fields. Each data key field includes a data key identifier, document identifier data, and an offset field. The document identifier data is provided to identify each document in which the data key identifier appears. The offset field includes a plurality of offset sequences wherein each offset sequence is associated with a respective document identified by the document identifier data and wherein each offset sequence identifies the location of each data key within its associated document by identifying the offset of the data key from the preceding data key. In accordance with the subject invention, the document identifier data and the offset data field are compressed by disclosed methods.

16 Claims, 10 Drawing Sheets

METHOD FOR COMPRESSING FULL TEXT INDEXES WITH DOCUMENT IDENTIFIERS AND LOCATION OFFSETS

FIELD OF THE INVENTION

The subject invention is directed toward database storage techniques and, more particularly, toward an improved method for compressing full text indexes.

BACKGROUND OF THE INVENTION

Computer databases for storing full text indexes have become common for text storage and retrieval. These databases enable a user to search the index for particular data strings within the stored text. Typically, the index data is stored in a data structure separate from the text data of the database and, therefore, constitutes memory overhead. The memory overhead is justified since the index enables the user to quickly search the text data for the desired data string. However, it is desirable to minimize the memory overhead required for the index.

Many prior art methods provide an index by identifying each data string and associating with the data string an identifier of each location within the database that the data string appears. These indexes are obviously cumbersome and utilize a large amount of memory overhead. In similar fashion, other prior art methods using such indexes also use data compression techniques to reduce the memory overhead required. Nonetheless, these methods require memory for the index equal to between 50% and 100% of the memory required for the database, i.e., 50%–100% overhead.

Other methods for providing a text index have assigned codes to certain data sequences whereby the data sequence can be indexed as discussed above. Although this method works well for databases that exhibit strong patterns in data sequences, the method is not acceptable for databases having relatively few patterns in data sequences. Therefore, it is desirable to provide a method and apparatus for storing full text indices wherein the memory overhead required for the index is less than 20% of the storage required for the database.

SUMMARY OF THE INVENTION

The present invention comprises a method for storing index data of the type for providing a content index for a storage volume wherein the storage volume has a plurality of documents stored thereon. Each document has a unique document identifier and includes a plurality of data keys. The data key field provides the number of occurrences and location within the storage volume for a target data key. The method includes the steps of providing a data key identifier for identifying the target data key that is the subject of the data key field. Defining a document data set including a plurality of document identifiers each describing a plurality of target documents in which the target data key is located and, thereafter, compressing the document data set into document identifier data in accordance with a first predetermined compression scheme so that when decompressed the document data set will be recovered. Providing a plurality of count values wherein each count value is associated with a respective one of the plurality of document identifiers in the document data set and identifies the number of occurrences of the target data key in the document identified by its respective document identifier. The method also includes the step of providing a plurality of data key offset value sets wherein each data key offset value set is associated with a respective one of the plurality of count values and wherein each data key offset value set includes a plurality of data offset values equal in number to the number of occurrences of the target data key identified by its respective count value. Accordingly, each data key offset value identifies the location of the target data key in the document identified by the document identifier associated with the count value of with its respective data key offset value set.

In a first embodiment of the invention, the document data set is compressed by the method including the step of defining the range of document identifiers by selecting the minimum document identifier and maximum document identifier as the end points of the range. After the range is selected, the mid-point between the end points of the range of the document identifier is identified to partition the range of document identifiers into first and second groups. The document identifiers are then compressed by providing document identifier data to characterize the distribution of the documents between the first and second groups wherein the document identifier data identifies each of the document identifiers in the range.

In a second embodiment of the invention, the plurality of data key offset values are also compressed in accordance with a method including the step of selecting a base number of data bits N. The method further includes the step of selecting a portion, r, of the most significant bits from the base number of data bits to indicate that a data key offset value is encoded and identifying the remaining least significant data bits as the base number, q, so that r+q=N. Thereafter, a determination is made as to whether a data key offset value can be represented with N bits without the r most significant bits being set and, if so, the data key offset value is represented with N bits. If, however, the data key offset value cannot be represented with N bits without the r most significant bits being set, then the r most significant bits are set and the q least significant bits of the data key offset value used with the r most significant bits being set to indicate that the most significant bits of the data key offset value are encoded.

DETAILED DESCRIPTION OF THE INVENTION

Figure 1:
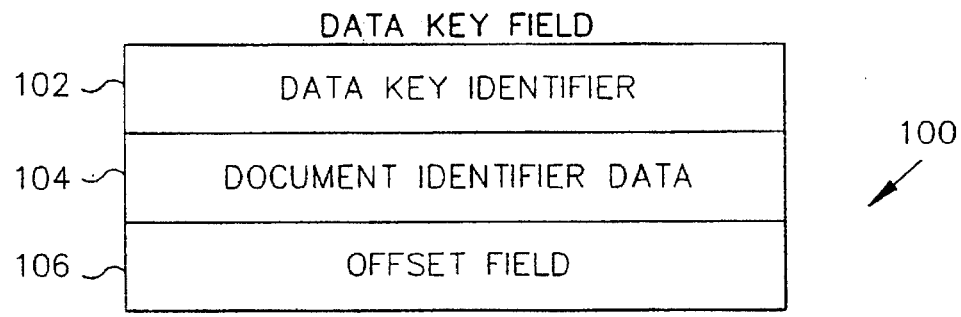
FIG. 1 is a chart illustrating the overall structure of a text index database stored in accordance with the subject method.

As mentioned above, the subject invention provides a method for storing a full text index wherein the memory overhead required to store the index is minimized. In general, the index of the subject invention comprises a plurality of data key fields 100, the structure of which is illustrated in FIG. 1. Each data key field 100 includes a data key identifier 102, a document identifier data 104, and an offset field 106. The data key identifier 102 is a data word used to identify a text or data sequence to be indexed. As an example, a text database may be developed to record the text of articles from a periodical such as a monthly publication. The text index may be comprised of words that appear in the articles of the periodical. The data key identifiers 102 of the text index will be used to identify the separate words to be located in the periodical.

The data key field 100 is provided to associate the data key identifier 102 with its respective document identifier data 104 and offset field 106. The document identifier data 104 is data that identifies each document in the database in which the text sequence associated with the data key identifier 102 appears. In the foregoing example, the document identifier data 104 will identify each article in the periodical database in which the word identified by the data key identifier 102 appears.

Figure 2:
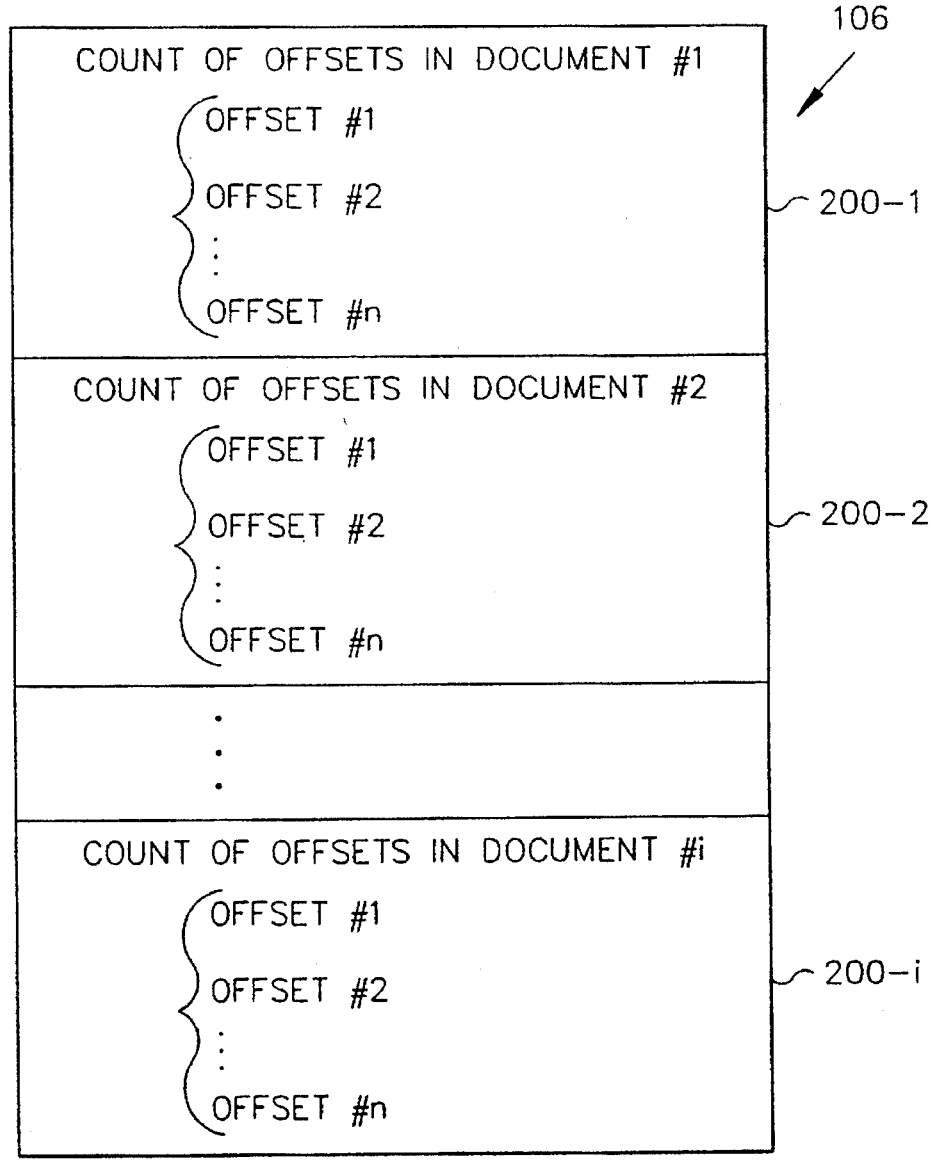
FIG. 2 is a chart illustrating the structure of an offset field of a text index stored in accordance with the subject method.

The offset field 106 comprises a plurality of offset data sequences 200-1 to 200-i, as illustrated in FIG. 2. In accordance with the subject invention, an offset data sequence 200 is provided for each document identified by the document identifier data 104 (FIG. 1). Each offset data sequence 200 includes a plurality of offsets, n, wherein each offset identifies the location of the data key identifier 102 in the document corresponding to the offset data sequence. As an example, the first offset data sequence 200-1 corresponds to the first document identified by the document identifier data 104. Offset number 1 identifies the first offset of the text sequence identified by the data key identifier 102 within the first document. Offset number 2 identifies the second offset of the text sequence within the first document, etc. As discussed in more detail below, one presently preferred embodiment of the invention is structured so that each offset is measured from the preceding offset thereby to minimize the value of the offsets provided in the offset data sequences 200. However, those skilled in the art will appreciate that other methods exist for providing the plurality of offsets without departing from the scope of the present invention.

With further reference to the foregoing example of a periodical data base, a data key identifier 102 may be provided to identify a predetermined word. The data key field 100 will include this data key identifier 102 along with document identifier data to identify each article in which the word appears. The offset field 106 will include a count of offsets associated with each document identified by the document identifier data 104. Each offset will identify the location of the word within the document by providing a value indicative of the offset of the word from the previous offset. For instance, the first offset may be 20 indicating that the word first appears as the $20^{th}$ word of the document. The second offset may be 50 indicating that the second time the word appears is 50 words from the first occurrence, which is 70 words from the beginning of the document.

In accordance with the method described above, a text index can be efficiently stored to enable a user to locate offset data sequences within a database. The foregoing method for storing a text index efficiently conserves memory thereby reducing memory overhead. However, a further reduction in the amount of memory overhead necessary for storing the text index can be achieved by providing methods for compressing the various components of the data key field 100. Particularly, methods may be provided for compressing the document identifier data 104 and the offset field 106, as discussed more fully below.

Figure 3A:
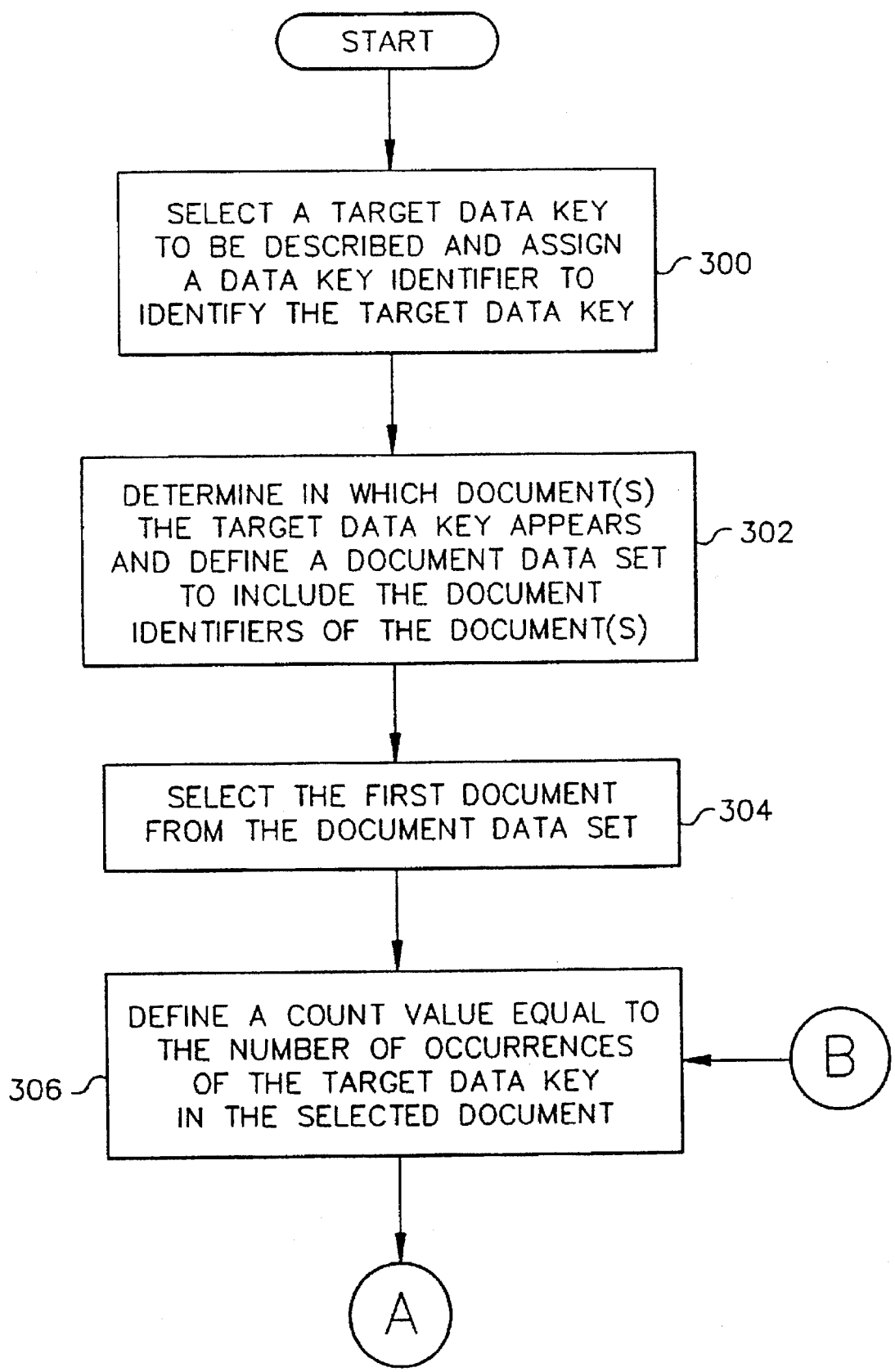
FIGS. 3A, 3B, and 3C are decision flow diagrams illustrating the method of the subject invention for storing text index data.
Figure 3B:
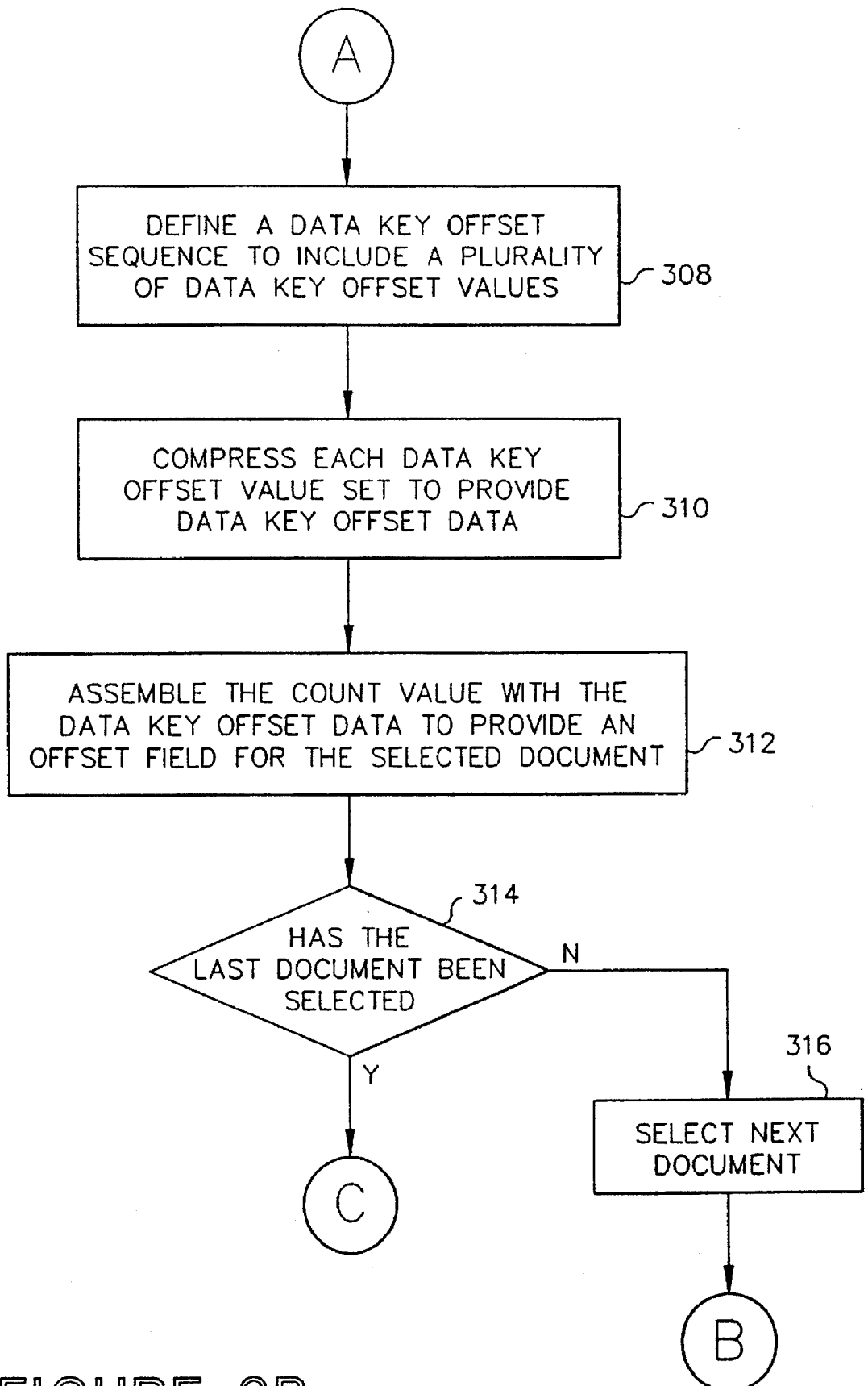
Figure 3C:
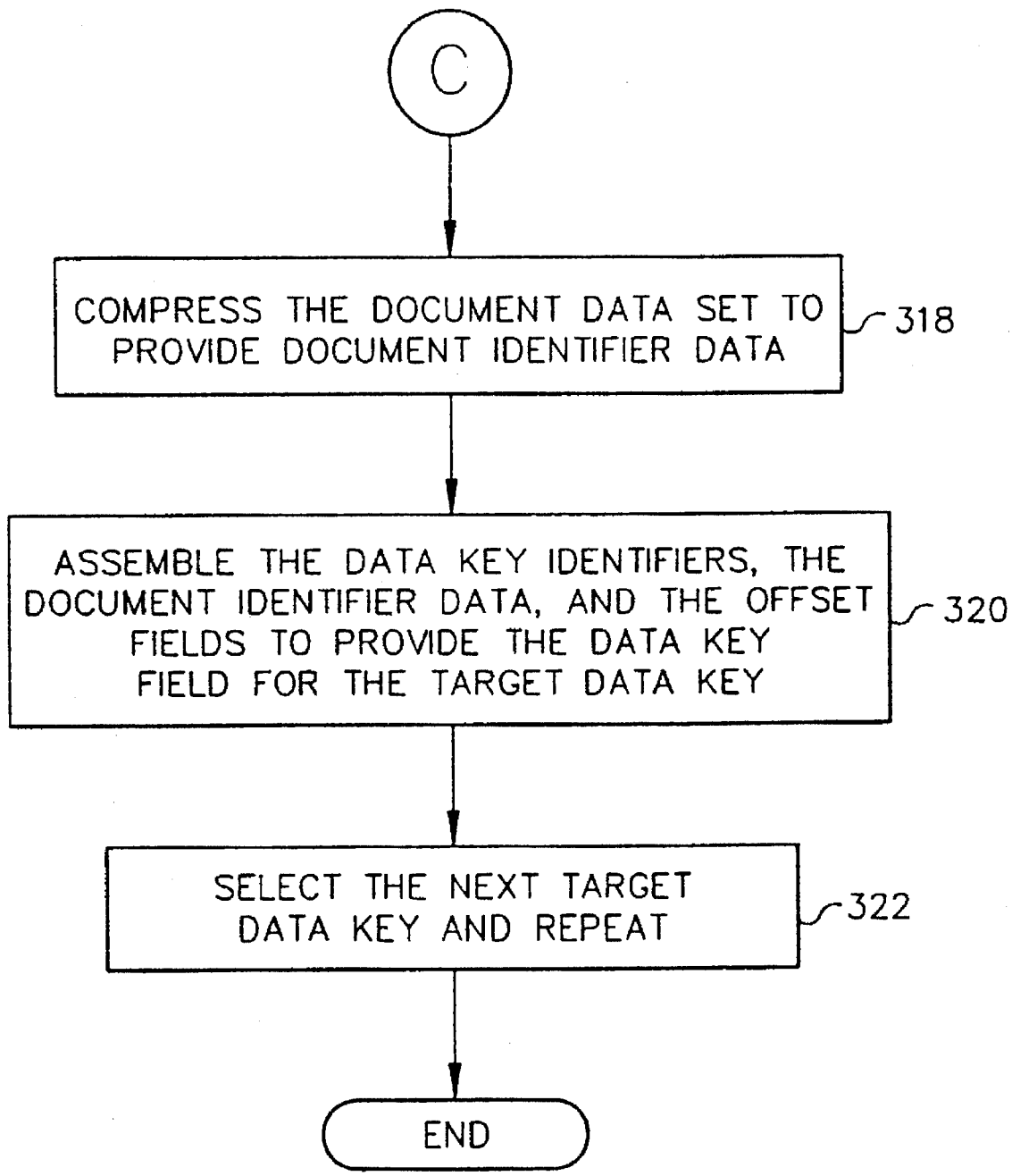

With reference to FIG. 3a, 3b, and 3c, a method is illustrated for providing the plurality of data key fields 100, discussed above. Initially, a data key identifier 102 is assigned to identify a text sequence, refered to herein as a target data key, step 300. The target data key may be any text or data sequence for which a data key field is desired. In the example discussed above, the target data key may be a specific word that appears in the periodical database. Thereafter, each document in which the target data key appears is identified so that a document data set is defined wherein the document data set includes the document identifier of each document in which the target data key appears, step 302. With further reference to the example discussed above, the document data set will include the document identifier to identify each article in which the target data key, or particular word, appears. Thereafter, the first document from the document data set is selected so that the offset field 106 (FIG. 1) may be determined, step 304.

To provide the offset field 106, the method determines the number of occurrences of the target data key in the selected document and provides a count value indicative of the number of occurrences, step 306. Thereafter, a data key offset sequence is provided and includes a plurality of data key offset values indicating the location of the target data key within the first document, as discussed above, step 308 (FIG. 3B). In accordance with the method of the subject invention, each data key offset sequence is then compressed to minimize the data required to express the offset sequence for the subject document, step 310. Although a variety of methods may be used for compressing the data key offset sequences, a particular method is used in a presently preferred embodiment of the invention, as will be discussed in more detail below, by reference to FIGS. 4 and 5.

After the data key offset value set is compressed, by whatever method selected, the compressed data is assembled with the count value to provide the offset field for the selected document, step 312. A decision is then made to determine if the last document of the document data set (defined in step 302, above) has been selected and, if not, the next document is selected, step 316, and steps 306-316 repeated until an offset field has been provided for each document identified in the document data set. Thereafter, the document data set is compressed to provide the document identifier data 104 illustrated in FIG. 1, step 318 (FIG. 3C). As with the compression of the data key offset value set discussed by reference to step 310, compression of the document data set may be provided by a variety of methods known in the art. However, the presently preferred method for compressing the document data set will be described below by reference to FIGS. 6A, 6B, 6C, and 6D.

The data key field 100 is then assembled using the data key identifier 102, the document identifier data, and the offset field, step 320. The next target data key is selected and the methods of FIGS. 3A, 3B and 3C repeated until each target data key has been provided with a data key field 100, step 322.

As mentioned above, the offset fields 106 and document identifier data 104 are both compressed to reduce the memory necessary for storage of the plurality of data key fields 100. As also discussed above, the offset field 106 includes a plurality of offsets each identifying the location of a data key within a document using as a reference the previous location of the data key. A presently preferred method for compressing the offset field 106 is described in the decision flow diagram of FIGS. 4 and 5.

Figure 4:
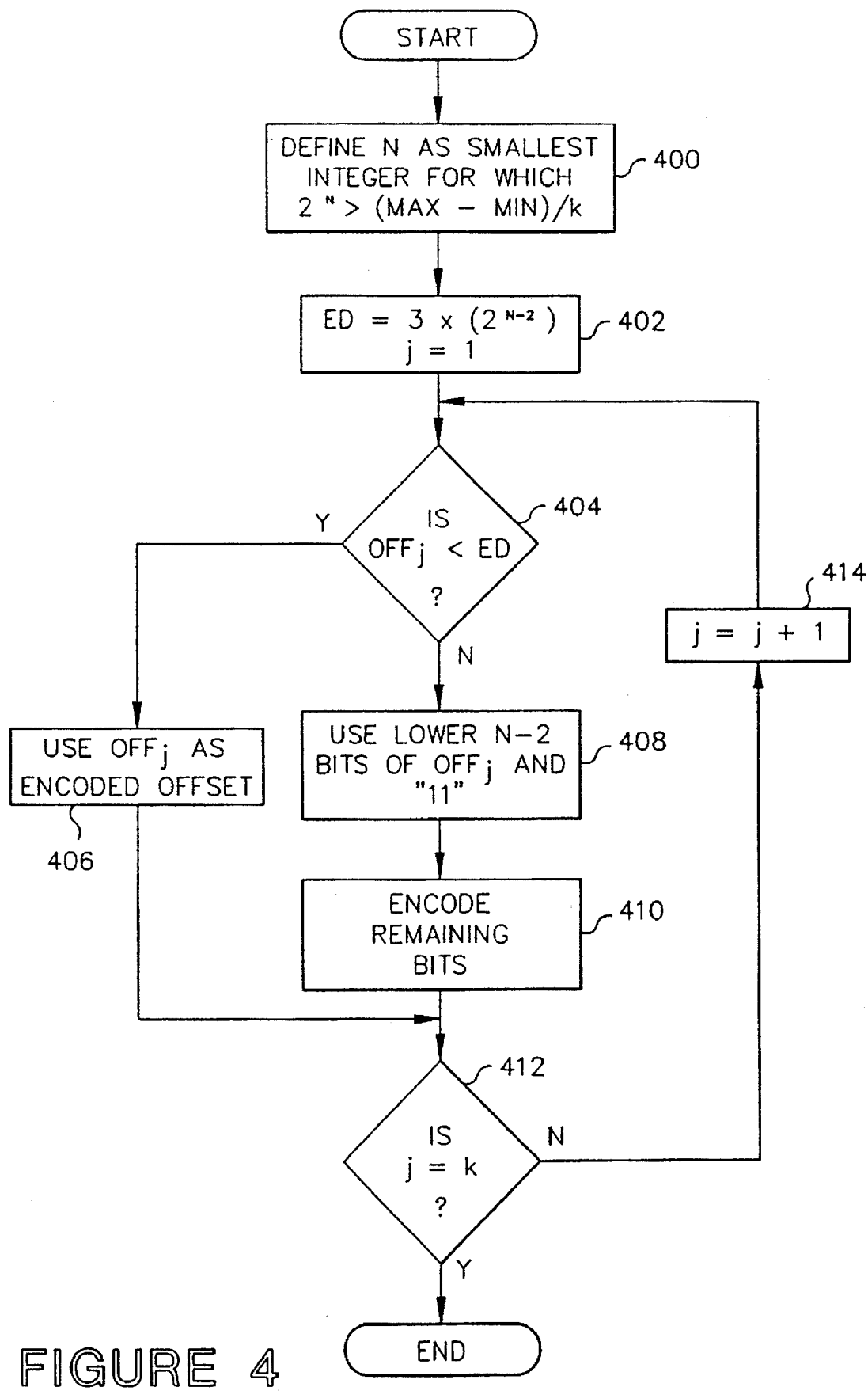
FIG. 4 is a decision flow diagram illustrating the method for storing the offset field data illustrated in FIGS. 1 and 2.

Generally, each offset data sequence (step 308, FIG. 3B) is compressed by encoding the sequence in accordance with the method illustrated in FIG. 4. Therein, a variable length encoding technique is described that first defines a reference number N as the smallest integer for which:

$$2^N > (max-min)/k, \quad (1)$$

step 400, wherein max (maximum) is the last data key offset in the document, i.e., the offset that identifies the $70^{th}$ word, and min (minimum) is the first data key offset in the document, i.e., the offset that identifies the $20^{th}$ word, so that maximum minus minimum refers to the range of data keys in the document, and wherein k refers to the number of data keys in the document, i.e., the count of offsets, as discussed above by reference to step 306 (FIG. 3A). After the referenced number, N, has been defined an encoding variable ED is defined as follows:

$$ED = 3 \times (2^{N-2}). \quad (2)$$

ED represents one more than the maximum number that can be represented using N bits without having both of the two highest order bits set equal to 1. As an example, if the reference number N is equal to 7, then the encoding variable ED is equal to 96. In this example, 95 is the highest number that can be represented without setting both of the most significant data bits, i.e., 1011111 is the highest binary number that can be represented without setting both of the most significant data bits and is equal to 95.

Returning to FIG. 4, each offset is compared to the encoding variable ED, step 404. If the offset value is less than the variable ED, in the example above less than 95, then the offset value is used without encoding, step 406. However, if the offset is equal to or greater than the variable ED, then the lower N-2 bits of the offset is used, step 408, in combination with "11". It will be apparent to those skilled in the art that since only offsets less than the encoding variable ED are used without encoding, setting the two most significant bits of any field will indicate that the offset is greater than ED and that only the least significant N-2 bits of the offset have been provided. Stated differently, any time either of the most significant two bits of a field are not set, then the offset value was less than the variable ED, in the example above less than 96, and the field is not encoded. Conversely, if both of the most significant bits of a field are set, then the offset value was greater than the variable ED and the field is encoded.

As stated above, if the offset is greater than the variable ED, the least significant N-2 bits of the offset are used and combined with "11" to indicate that the field has been encoded. The most significant bits of the offset are then encoded, step 410, according to a predetermined encoding method. The index variable j is compared to the number of offset values to determine whether each offset has been encoded, step 412, and, if not, the index variable j is incremented, step 414, and steps 404–414 are repeated until each offset of the offset data sequence has been encoded.

Figure 5:
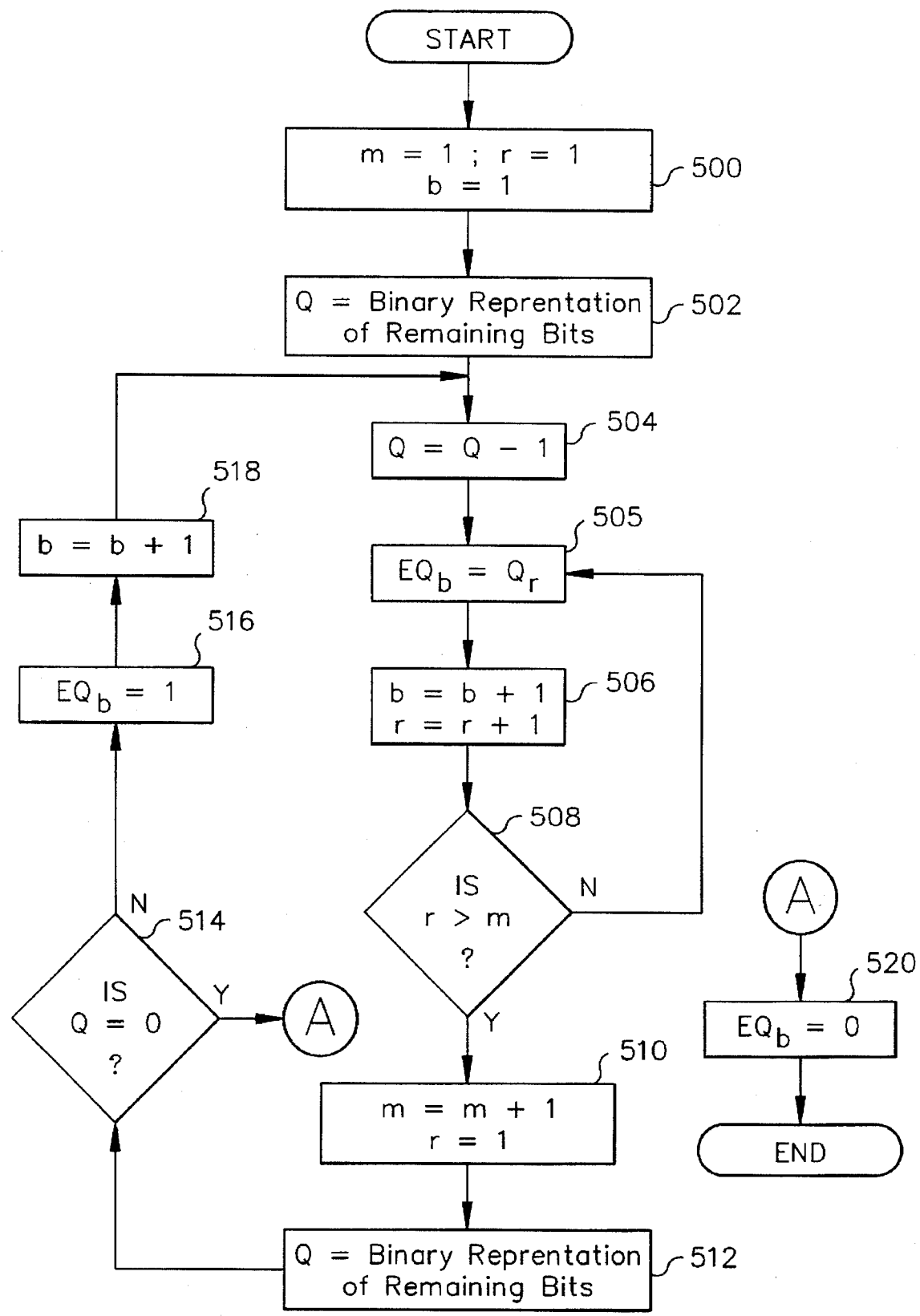
FIG. 5 is a decision flow diagram illustrating the method for storing the offset field data illustrated in FIGS. 1 and 2.
Figure 6A:
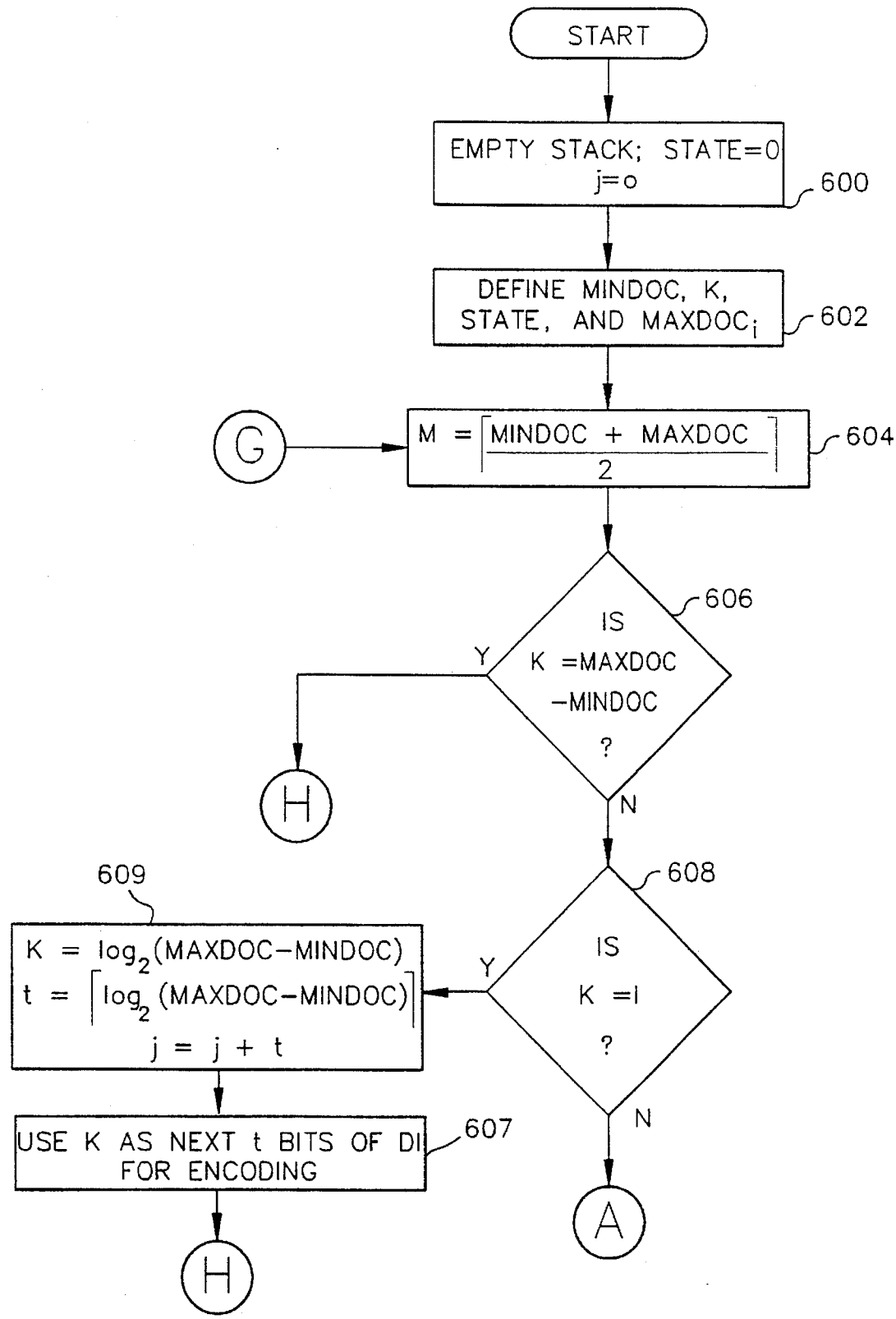
FIGS. 6A, 6B, 6C, and 6D are decision flow diagrams illustrating the method for storing document identifier data illustrated in FIGS. 1 and 2.
Figure 6B:
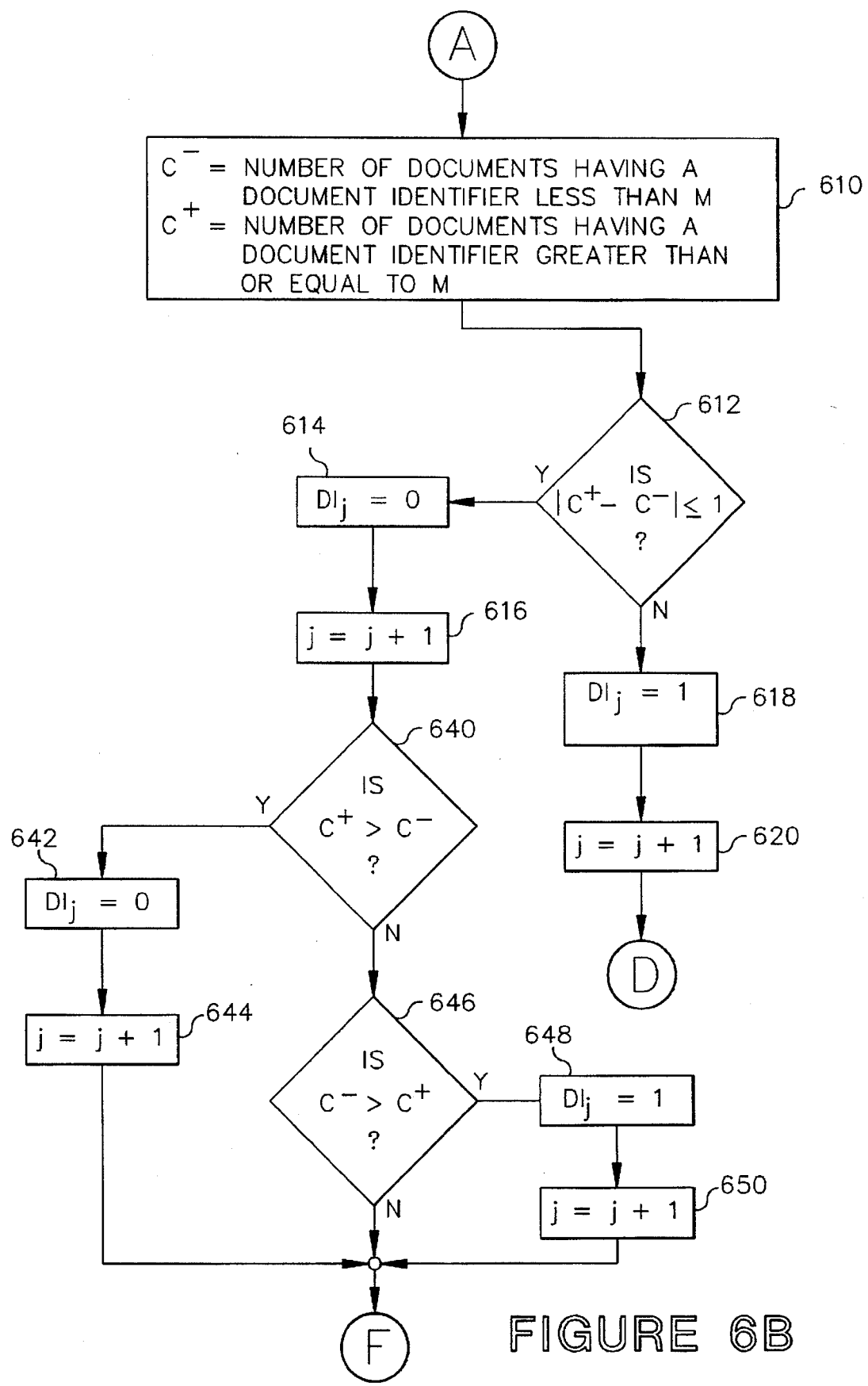
Figure 6C:
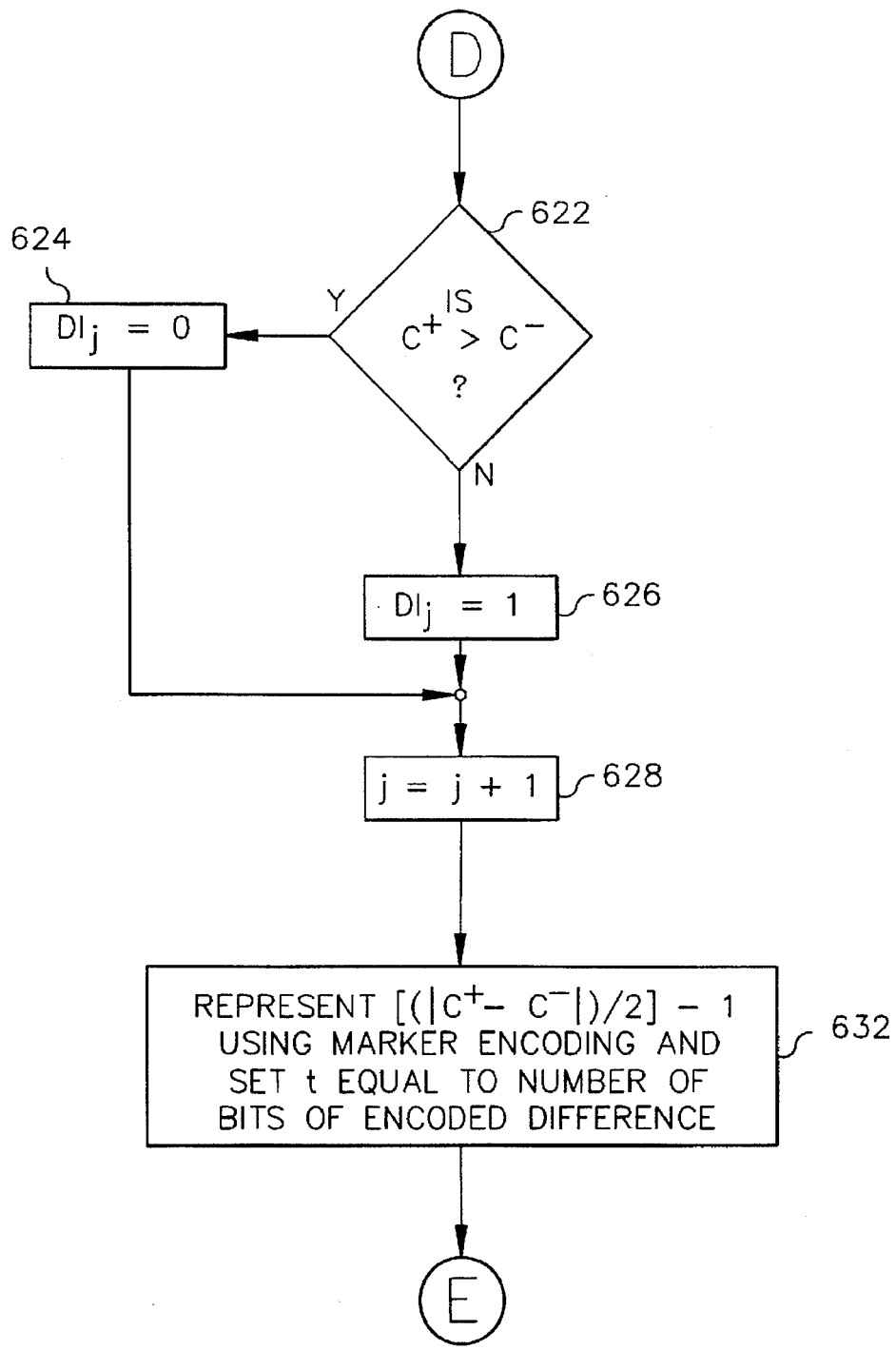
Figure 6D:
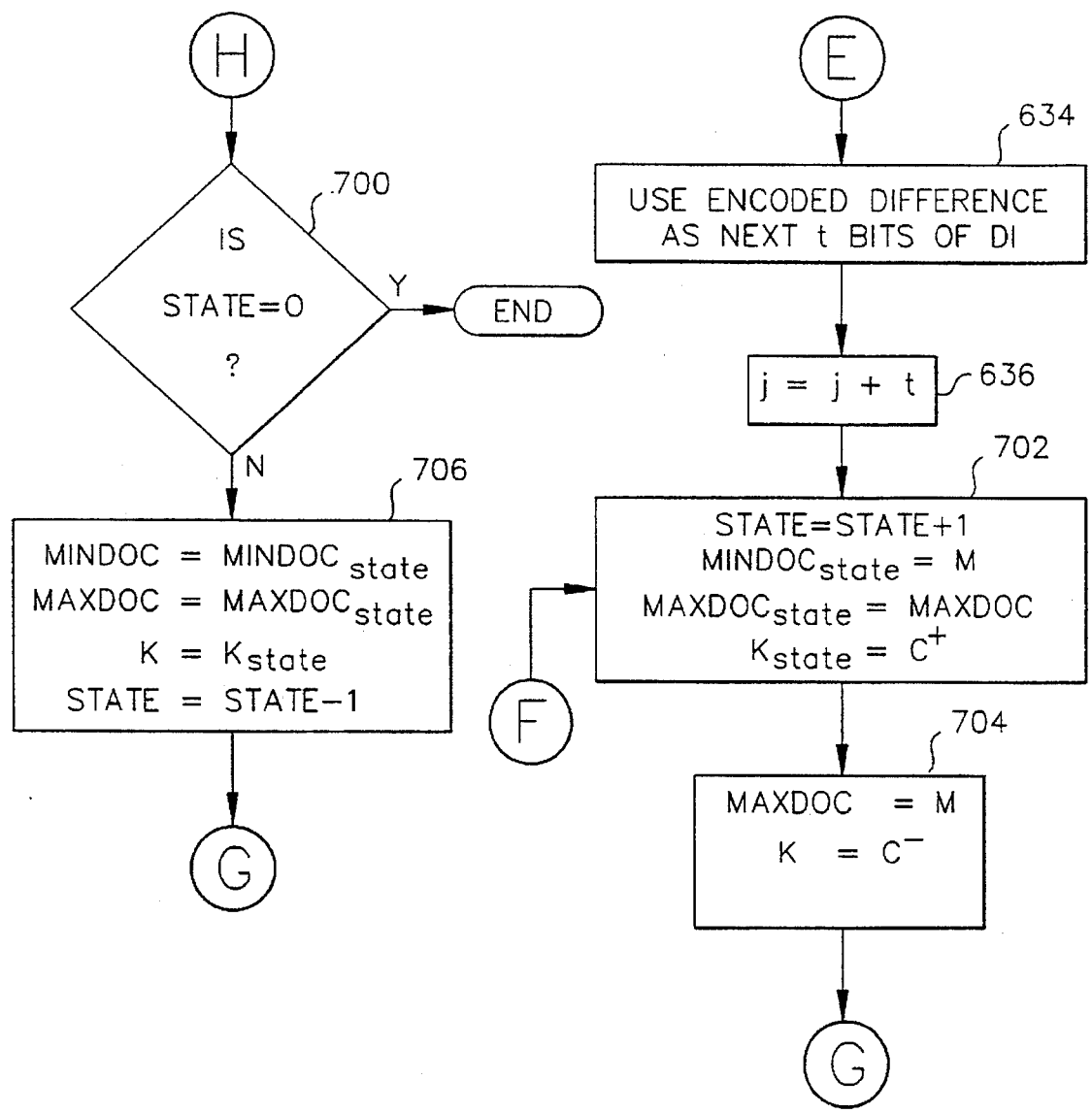

A presently preferred method for encoding the remaining data bits, referred to herein as the "Marker Encoding Method" and discussed by reference to step 410, is illustrated in FIG. 5. With reference to FIG. 5, a number of index values m, r, and b are each set to 1, step 500. Thereafter, Q is defined as a binary representation of the remaining bits, i.e., the most significant bits of the offset to be encoded (referred to in step 410, above), step 502. Since the binary representation is known to be non-zero, i.e., greater than 1, 1 is subtracted from Q to further minimize the memory overhead for the remaining bits, step 504. Thereafter, the first encoded bit $EQ_1$ is set equal to the least significant bit of Q, step 505. As an example, if the bits remaining after the least significant N-2 bits were selected, steps 408 and 410 of FIG. 4, is as follows:

$$Q=1010, \quad (3)$$

then, $$Q-1=1001, \quad (4)$$

step 504, and the least significant bit or $EQ_1$ equals 1, step 505. Thereafter, the index variables b and r are incremented, step 506, and the index variable r is compared to the index variable m, step 508. In accordance with the subject method, the number of remaining bits is assumed to be small. Accordingly, initially only one bit of Q is encoded, i.e., N=1. Thereafter, if further encoding is necessary, m is incremented so that additional bits will be encoded, as will be discussed below. Therefore, m represents the number of bits of the remainder to be encoded. The comparison of r with m in step 508 is to determine whether the appropriate number of bits of the remainder have been encoded.

In the example above, after being incremented r will be equal to 2 and m equal to 1, so that r will be greater than m and step 510 will be performed wherein m will be incremented by 1 and r will be returned to a value of 1. Q is then set equal to the binary representation of the bits remaining after the first bit(s) has been encoded, step 512. In the example above, after the least significant bit of 1001 is encoded, $EQ_1=1$, then the binary representation of the remaining bits is "100". If Q is equal to zero, step 514, then the method is ended, step 520. However, as in the example above, if Q is not equal to zero then the next encoded bit is set equal to 1, step 516, and the index variable b is incremented by 1, step 518. Steps 504–518 are repeated until Q is equal to 0, step 514, at which point the next encoded bit $EQ_b$ is set equal to zero, step 520.

Those skilled in the art will appreciate that steps 516 and 520 serve to provide indicators of whether the encoding is completed, i.e., a "1" indicates that further encoding is provided while a "0" indicates that the coding is terminated. Further, the encoding could be performed a single bit at a time so that every other bit would be indicative of whether further encoding existed. However, because of the determination of step 508, as discussed above, a first bit is encoded followed by an indicator. If the indicator indicates subsequent encoding, m is increased so that 2 bits are encoded followed by an indicator. If the indicator indicates subsequent encoding m is increased so that 3 bits are encoded followed by a subsequent indicator, etc. Other ways for increasing the encoding will be readily apparent to those skilled in the art.

In addition to compressing the offset field 106 (FIG. 1), the document identifier data 104 is also compressed. A presently preferred method for compressing the document identifier data 104 is illustrated in the decision flow diagrams of FIGS. 6A, 6B, 6C, and 6D. Although the method is described by reference to the document identifier data 104 discussed above by reference to FIGS. 1, 3A, 3B, and 3C, it will be appreciated by those skilled in the art that the method illustrated in FIGS. 6A, 6B, 6C, and 6D is applicable to any data sequence and particularly applicable to data sequences wherein the data is relatively evenly distributed.

With reference to FIGS. 6A, 6B, 6C, and 6D, a method is illustrated for encoding the document identifier data in accordance with a partitioning encoding method. A counter j and a stack are initialized at step 600. The counter j is used to identify the bits of the encoded document identifier data, the bits being stored in a bit 'a' bit array DIj. The stack is used so that the method of FIGS. 6A, 6B, 6C, and 6D will be performed recursively, as will be described in greater detail below. The document identifier data, or other sequence, is first examined to describe the number of elements in the sequence, i.e., the number of documents identified by the document identifier data, K, the minimum value of the elements in the sequence, MIN, and the maximum value of the elements in the sequence, MAX. Thereafter, variables K, MINDOC, and MAXDOC are defined, step 602. Initially, MINDOC and MAXDOC are equal to MIN and MAX, respectively. Thereafter, the midpoint between MINDOC and MAXDOC is described as M, step 604, as follows:

$$M = \text{ceiling} \left( (MINDOC+MAXDOC)/2 \right). \tag{5}$$

A decision is made to determine if the number of documents within the range is equal to the range, i.e., if the documents are spaced one from another, step 606, and, if so, the method proceeds to step 700 to evaluate the stack, as will be described below. Thereafter, a determination is made if the number of documents within the range is equal to 1, step 608, and, if so, the document identifier K is used as the next t bits of the encoding, steps 607 and 609, and the method proceeds to step 700. If neither of the foregoing criteria is true, then $C^+$ and $C^-$ are defined as the number of documents having a document identifier greater than or equal to M and the number of documents having a document identifier less than M, respectively, step 610. $C^+$ and $C^-$ are compared to determine whether $C^+$ differs from $C^-$ by either "0" (i.e., $C^+$ is equal to $C^-$) or "1" (i.e., $C^+$ is 1 more or 1 less than $C^-$), step 612, and, if so, an encoded identifier bit is set equal to "0" and the index variable j is incremented by 1, steps 614 and 616. If, however, a greater number of documents is either in the range above or less than M, then an encoded data bit is set equal to "1", step 618. Thereafter, the index variable j is incremented, step 620. Next, a determination is made as to whether $C^+$ is larger than $C^-$, step 622, and, if so, an encoded data bit is set equal to "0", step 624, and if not, an encoded data bit is set equal to "1", step 626. Thereafter, the index variable j is again incremented, step 628. Thereafter, step 632 is performed to represent the difference between the number of documents in the upper range and the number of documents in the lower range, and the encoded difference is used as the next t bits of the encoded document identifier data, step 634. Thereafter, the index variable j is incremented by the index variable t. The method returns to step 602 to identify another partition.

Returning to step 616 (FIG. 6B), after $C^+$ is compared to $C^-$ to determine whether they differ by either 0 or 1, step 612, and a zero encoded bit is added if the result of the comparison is affirmative, step 614 and step 616, then additional data bits are provided to characterize the nature of the difference. Particularly, a determination is made whether $C^+$ is greater than $C^-$, step 640, and, if so, a zero bit is provided as the next encoded data bit, step 642, and j incremented by 1, step 644. If $C^+$ is not greater than $C^-$, step 640, then a determination is made as to whether $C^-$ is greater than $C^+$, step 646. If so, a 1 is added as the next encoded data bit, step 648, and the index variable j is incremented by 1, step 650. If $C^+$ is equal to $C^-$, i.e., the determination in both step 640 and 646 is negative, then no additional encoded data bits are added. Those skilled in the art will appreciate that steps 610–628 and 640–650 are provided to characterize the distribution of the documents within the range MINDOC to MAXDOC. The range is partitioned by the value M and encoded data bits are provided, the first identifying whether an equal number of documents is in the range above M as below m, and the second identifying whether more documents are provided in the range above M than are in the range below M.

So that the method can be performed recursively, the range characterized by steps 610–628 and 640–650 is divided in half and the method of steps 604–636 repeated for each half of the range. The stack is used to remember the state of that portion of the range that is saved for later operation. Accordingly, the state of the stack is incremented by 1 and variables defining the upper portion of the range to be remembered are stored on the stack, step 702. Thereafter, variables to operate upon the lower portion of the partitioned range are defined, step 704. In similar fashion, after it is determined that either the number of documents in a range is equal to the range, step 606 or the number of documents in a range is equal to 1, step 608 then the stack is consulted to determine whether any upper portions remain to be encoded, step 700. If the state variable is equal to 0, then no upper portions remain and the method is ended. Alternatively, if the state variable is non-zero, then the range to be operated upon is defined by the last entry on the stack and the state variable decreased by 1, step 706.

From the foregoing it will be appreciated that, although a specified embodiment of the invention has been described herein for purposes of illustration, various modifications may be made without deviating from the spirit and scope of the invention. Accordingly, the invention is not limited except as by the appended claims.

We claim:

1. A method for compressing index data of a type for providing a content index for a storage volume wherein the storage volume has a plurality of documents stored thereon, each document having a unique document identifier, the content index providing information indicating a number of occurrences and locations within the storage volume for a plurality of data keys, said method comprising the steps of:

(a) providing document identifier data including a set of document identifiers that indicates a corresponding set of documents in which a target data key appears wherein the target data key is a particular one of the plurality of data keys and the document identifiers in the set of document identifiers have values within a range from a minimum document identifier MinDoc to a maximum document identifier MaxDoc, the document identifier data being compressed according to the following substeps:

(i) selecting a value M to partition the range of document identifiers into first and second groups wherein document identifiers having values less than M are associated with the first group and document identifiers having values greater than M are associated with the second group;

(ii) providing a first document identifier data bit that indicates whether the difference between the number of document identifiers associated with the first group and the number of document identifiers associated with the second group is greater than one;

(iii) providing a second document identifier data bit that indicates whether the number of document identifiers associated with the first group is greater than the number of document identifiers associated with the second group;

(iv) providing a difference data key to indicate the difference between the number of document identifiers associated with the first group and the number of document identifiers associated with the second group;

(v) selecting new values for MaxDoc, MinDoc, and M to define a new partition and repeating steps a(i)–(iv); and (vi) repeating steps a(i)–(v) until all document identifiers have been encoded; and (b) providing a plurality of data key offset value sets wherein each data key offset value set includes a plurality of data key offset values for indicating location offset values between successive occurrences of the target data key within a particular document, each data key offset value set being compressed according to the following substeps:

(i) selecting a data key offset value and a base data key offset value length having a number N of data bits;

(ii) selecting a remainder indicator value that can be represented by data bits and that is greater than a maximum number that can be represented by N-r data bits wherein r is a predetermined constant having a value less than N;

(iii) determining whether the selected data key offset value is greater than the remainder indicator value and, if so, performing steps (b)(iv)–(vii), and, if not, using N data bits to represent the data key offset value and performing step (b)(viii);

(iv) using the lower order N-r data bits of the data key offset value and setting the higher order r data bits to indicate that a remainder exists;

(v) subtracting one from the remaining higher order data bits to determine the next s bits of the encoding, wherein s is a predetermined constant and using the next s bits as the encoding;

(vi) determining whether all data bits of the data key offset value have been encoded and, if not, performing step (b)(vii), and, if so providing a marker to indicate that the data key offset value is completely encoded and performing step (b)(viii);

(vii) adding a marker bit to indicate that additional higher order data bits remain, incrementing s by a predetermined value t and performing step (b)(v); and (viii) selecting a next data key offset value and repeating steps (b)(iii)–(vii) until all data key offset values in the data key offset value set have been represented in step (b)(iii) or encoded in steps (b)(iv)–(vii).

2. The method as recited in claim 1 wherein step (b)(i), selecting a base data key offset value length further comprises the substep of selecting N as the smallest integer that enables a value represented by a highest order bit of a binary data value having N+1 data bits to be greater than an average offset value, wherein the average offset value is equal to a total number of data keys in a portion of the storage medium divided by the number of occurrences of the target data key in the portion of the storage medium.

3. The method as recited in claim 1 wherein the remainder indicator value is selected to equal $3^{N-2}$.

4. The method as recited in claim 1 wherein step (a)(iv), providing a difference data key, comprises the substep of:

(c) providing difference data by taking the absolute value of the difference between the number of document identifiers associated with the first group and the number of document identifiers associated with the second group and dividing the difference by two.

5. The method as recited in claim 4 wherein step (c), providing difference data further comprises the substeps of:

(d) subtracting one from the difference data and using the lower order a bits of the difference data as the first encoded bits of the difference data key;

(e) determining whether all data bits of the difference data have been encoded and, if not, performing step (f), and, if so, adding a marker bit to indicate that the difference data key is complete; and (f) adding a marker bit to indicate that additional higher order data bits remain, incrementing a by a predetermined value b and repeating step (d).

6. The method as recited in claim 5 wherein step (b)(i), selecting a base data key offset value length further comprises the substep of selecting N as a smallest integer that enables a value represented by a highest order bit of a binary data value having N+1 data bits to be greater than an average offset value, wherein the average offset value is equal to a total number of data keys in a portion of the storage medium divided by the number of occurrences of the target data key in the portion of the storage medium.

7. A method for providing a compressed content index for a storage volume wherein the storage volume has a plurality of documents stored thereon, each document having a unique document identifier and including a plurality of data keys, the content index providing information indicating a number of occurrences and locations within the storage volume for a target data key of the plurality of data keys, said method comprising the steps of:

providing a data key identifier for identifying the target data key that is the subject of the data key field;

identifying a plurality of target documents in which the target data key is located, each of the target documents identified having a unique target document identifier that identifies the target document;

compressing the plurality of target document identifiers in accordance with a first predetermined compression scheme that enables the plurality of target document identifiers to be recovered when the compressed plurality of target document identifiers is decompressed, wherein the compressing step includes:

ordering the plurality of target document identifiers in a range from a minimum target document identifier to a maximum target document identifier;

selecting a midpoint between the minimum target document identifier and the maximum target document identifier;

partitioning the range into first and second groups at the selected midpoint; and providing encoded document identifier data that characterize how the target documents are distributed between the first and second groups, the encoded data identifying each of the target document identifiers in the range;

providing a plurality of count values wherein each count value is associated with a respective one of the target document identifiers in the document data set and identifies how many occurrences of the target data key are in the target document identified by its respective target document identifier; and providing a plurality of data key offset value sets wherein each data key offset value set is associated with a respective one of the target documents and wherein each data key offset value set includes a plurality of data offset values equal in number to the number of occurrences of the target data key in the target document associated with the data key offset value set, each data key offset value identifying the location of the target data key in the target document associated with the data key offset value set.

8. The method as recited in claim 7 wherein the compressing step further includes:

determining whether the first group consists of one target document identifier or includes a target document identifier for each step in the first group;

if the first group consists of one target document identifier, then outputting an indication of the one target document identifier;

if the first group includes a target document identifier for each step in the first group, then stopping encoding for the first group; and if the first group includes more than one target document identifier and less than a target document identifier for each step in the first group, then partitioning the first group into sub-groups and providing encoded document identifier data that characterize how the target documents are distributed between the first and second sub-groups, the encoded data identifying each of the target document identifiers in the first group.

9. The method as recited in claim 7 further comprising the step of:

compressing the plurality of data key offset values.

10. A method for providing a data key field for index data of the type for providing a content index for a storage volume wherein the storage volume has a plurality of documents stored thereon, each document having a unique document identifier and including a plurality of data keys, the data key field providing information indicating a number of occurrences and locations within the storage volume for a target data key of the plurality of data keys, said method comprising the steps of:

providing a data key identifier for identifying the target data key that is the subject of the data key field;

defining a document data set including a plurality of document identifiers each describing a plurality of target documents in which the target data key is located;

compressing the document data set into document identifier data in accordance with a first predetermined compression scheme that enables the document data set to be recovered when the document identifier data is decompressed;

providing a plurality of count values wherein each count value is associated with a respective one of the plurality of document identifiers in the document data set and identifies how many occurrences of the target data key are in the document identified by its respective document identifier; and providing a plurality of data key offset value sets wherein each data key offset value set is associated with a respective one of the plurality of count values and wherein each data key offset value set includes a plurality of data offset values equal in number to the number of occurrences of the target data key identified by its respective count value, each data key offset value identifying the location of the target data key in the document identified by the document identifier associated with the count value associated with its respective data key offset value set; and compressing the plurality of data key offset values by substeps that include:

selecting a base number $\underline{N}$ of data bits;

selecting a portion r of the most significant bits from the base number N of data bits to indicate that a data key offset value is encoded and identifying the remaining least significant data bits as the base number, q, so that r+q=N;

determining whether a data key offset value can be represented with N bits without the r most significant bits set and, if so, representing the data key offset value with N bits and, if not, setting the r most significant bits of the N base bits, representing the q least significant bits of the data key offset value, and encoding the remaining most significant bits of the data key offset value.

11. The method as recited in claim 10 wherein the step of selecting a base number $\underline{N}$ of data bits comprises the sub step of:

determining the average value of the plurality of data key offset values to be encoded and selecting N as the number of bits necessary to represent the average value.

12. A computer-usable storage medium for providing encoded index data used to provide a content index for a plurality of documents, each document having a unique document identifier and a plurality of data keys, the medium comprising:

a target data key identifier module that provides a target data key identifier that identifies a target data key of the plurality of data keys;

a document data set module that defines a document data set including a plurality of document identifiers each describing a plurality of target documents in which the target data key is located;

a compression module that compresses the document data set into encoded document identifier data in accordance with a first predetermined compression scheme that enables the document data set to be recovered when the encoded document identifier data are decompressed, wherein the compression module includes:

range defining instructions that define a range of document identifiers by selecting the minimum document identifier and maximum document identifier as the endpoints of the range;

midpoint selecting instructions that select the midpoint between the endpoints of the range of the document identifiers and partition the range of document identifiers into a first group and a second group at the midpoint selected; and encoder instructions that provide document identifier data to characterize the distribution of the documents between the first and second groups wherein the document identifier data identifies each of the document identifiers in the range;

a count value module that provides a plurality of count values wherein each count value is associated with a respective one of the target documents and identifies how many occurrences of the target data key are in the associated target document; and a data key offset value module that provides a plurality of data key offset value sets wherein each data key offset value set is associated with a respective one of the target documents and wherein each data key offset value set includes a plurality of data offset values equal in number to the number of occurrences of the target data key in the associated target document, each data key offset value identifying the location of the target data key in the associated target document.

13. The computer-usable storage medium as recited in claim 12 wherein the compression module further includes:

instructions that determine whether the first group consists of one target document identifier or includes a target document identifier for each step in the first group;

instructions for the one target document identifier if the first group consists of the one target document identifier;

instructions for stopping encoding for the first group if the first group includes a target document identifier for each step in the first group; and instructions for partitioning the first group into sub-groups and providing encoded document identifier data that characterize how the target documents are distributed between the first and second sub-groups if the first group includes more than one target document identifier and less than a target document identifier for each step in the first group, the encoded data identifying each of the target document identifiers in the first group.

14. The computer-usable storage medium as recited in claim 12, further comprising an offset compression module that compresses the plurality of data key offset value sets.

15. A computer-usable storage medium for providing encoded index data used to provide a content index for a plurality of documents, each document having a unique document identifier and a plurality of data keys, the medium comprising:

a target data key identifier module that provides a target data key identifier that identifies a target data key of the plurality of data keys;

a document data set module that defines a document data set including a plurality of document identifiers each describing a plurality of target documents in which the target data key is located;

a compression module that compresses the document data set into encoded document identifier data in accordance with a first predetermined compression scheme that enables the document data set to be recovered when the encoded document identifier data are decompressed;

a count value module that provides a plurality of count values wherein each count value is associated with a respective one of the target documents and identifies how many occurrences of the target data key are in the associated target document;

a data key offset value module that provides a plurality of data key offset value sets wherein each data key offset value set is associated with a respective one of the target documents and wherein each data key offset value set includes a plurality of data offset values equal in number to the number of occurrences of the target data key in the associated target document, each data key offset value identifying the location of the target data key in the associated target document; and an offset compression module that compresses the plurality of data key offset value sets, the offset compression module including:

instructions that select a base number $\underline{N}$ of data bits;

instructions that select a portion r of the most significant bits from the base number $\underline{N}$ of data bits to indicate that a data key offset value is encoded and identify the remaining least significant data bits as the base number, q, so that r+q=N; and instructions that determine whether a data key offset value can be represented with N bits without the r most significant bits set and, if so, represent the data key offset value with N bits and, if not, set the r most significant bits of the N base bits, represent the q least significant bits of the data key offset value, and encode the remaining most significant bits of the data key offset value.

16. The computer-usable storage medium as recited in claim 15 wherein the instructions that select a base number $\underline{N}$ of data bits include instructions that determine an average value of the plurality of data key offset values to be encoded and select N as the minimum number of bits necessary to represent the average value.

* * * * *